US012682479B2

(12) United States Patent
Foster et al.

(10) Patent No.: US 12,682,479 B2
(45) Date of Patent: Jul. 14, 2026

(54) SNAPSHOT HYPERSPECTRAL IMAGER FOR EMISSION AND REACTIONS (SHEAR)

(71) Applicant: The Johns Hopkins University, Baltimore, MD (US)

(72) Inventors: Mark Foster, Baltimore, MD (US); Milad Alemohammad, Baltimore, MD (US); Elliot Wainwright, Baltimore, MD (US); Timothy P. Weihs, Baltimore, MD (US); Jasper R. Stroud, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 132 days.

(21) Appl. No.: 17/793,349

(22) PCT Filed: Jan. 15, 2021

(86) PCT No.: PCT/US2021/013726
§ 371 (c)(1),
(2) Date: Jul. 15, 2022

(87) PCT Pub. No.: WO2021/146619
PCT Pub. Date: Jul. 22, 2021

(65) Prior Publication Data
US 2023/0052446 A1 Feb. 16, 2023

Related U.S. Application Data

(60) Provisional application No. 62/961,981, filed on Jan. 16, 2020.

(51) Int. Cl.
G01N 21/31 (2006.01)
G01N 21/75 (2006.01)
(Continued)

(52) U.S. Cl.
CPC .............. G06T 7/70 (2017.01); G01N 21/31 (2013.01); G01N 21/75 (2013.01);
(Continued)

(58) Field of Classification Search
CPC .......... G01J 3/0248; G01J 3/18; G01N 21/31; G01N 21/75; G01N 2201/0634; G01N 2201/0636; G02B 27/126; G02B 27/141
See application file for complete search history.

(56) References Cited

U.S. PATENT DOCUMENTS

2002/0051070 A1 5/2002 Ortyn et al.
2010/0073634 A1 3/2010 Ferguson et al.
(Continued)

FOREIGN PATENT DOCUMENTS

WO 2017-148665 A1 9/2017

OTHER PUBLICATIONS

Glumac, "Absorption Spectroscopy Measurements in Optically Dense Explosive Fireballs Using a Modeless Broadband Dye Laser", Appl. Spectrosc., (2009), vol. 63, 1075; DOI: 10.1366/000370209789379268.
(Continued)

*Primary Examiner* — Hina F Ayub
(74) *Attorney, Agent, or Firm* — Venable LLP; Ryan T. Ward

(57) ABSTRACT
A spectral imaging system includes an objective lens system, an optical splitter, a dispersion system, and an optical combiner. The optical splitter is arranged to be in an optical path of an object being imaged through the objective lens system to provide an imaging optical path and a spectrometer optical path. The dispersion system is arranged in the spectrometer optical path. The optical combiner is arranged in the imaging optical path and a path of dispersed light from
(Continued)

the dispersion system to combined dispersed light with a corresponding optical image of the object.

20 Claims, 12 Drawing Sheets

(51) Int. Cl.

| | | |
|---|---|---|
| *G02B 27/12* | (2006.01) | |
| *G02B 27/14* | (2006.01) | |
| *G06T 7/70* | (2017.01) | |

(52) U.S. Cl.
CPC ................ *G01N 2201/0634* (2013.01); *G01N 2201/0636* (2013.01); *G02B 27/126* (2013.01); *G02B 27/141* (2013.01); *G06T 2207/10016* (2013.01)

(56) References Cited

U.S. PATENT DOCUMENTS

| | | | |
|---|---|---|---|
| 2014/0361148 A1 | 12/2014 | Popescu et al. | |
| 2015/0369665 A1* | 12/2015 | Hajian | .................. G01J 3/2803 |
| | | | 356/326 |
| 2018/0309941 A1 | 10/2018 | Lopez et al. | |
| 2019/0096044 A1* | 3/2019 | Kim | ....................... H04N 23/10 |
| 2019/0223729 A1* | 7/2019 | Frisken | ................. G02B 27/00 |
| 2019/0271592 A1* | 9/2019 | Gray | ..................... G02B 21/16 |
| 2022/0198326 A1* | 6/2022 | King | ................. G01N 30/8644 |

OTHER PUBLICATIONS

Johnson et al., "Simultaneous Imaging and Spectroscopy of Detonation Interaction in Reactive and Energetic Materials", Appl. Spectrosc., (2017), vol. 71, 78; DOI: 10.1177/0003702816661726.

* cited by examiner

Side Channel

Main Channel $\int I(x - \tau_n, y, \lambda_n) \times M(x - \tau_n, y, \lambda_n) dn$ Sparse Mask or
Burning Particle
Point Sources $M(x, y, \lambda)$ Scene
Schematic Combustion
Scene Burning
Particles $I(x, y, \lambda)$

SNAPSHOT HYPERSPECTRAL IMAGER FOR EMISSION AND REACTIONS (SHEAR)

CROSS-REFERENCE OF RELATED APPLICATION

This application is a U.S. National Stage of PCT/US2021/013726, filed Jan. 15, 2021, which claims priority to U.S. Provisional Application No. 62/961,981, filed Jan. 16, 2020, the entire contents of which are hereby incorporated by reference.

FEDERAL FUNDING

This invention was made with government support under grant numbers HDTRA1-18-1-0016 and HDTRA1-15-1-0006 awarded by the Defense Threat Reduction Agency. The government has certain rights in the invention.

BACKGROUND

Related Art

Hyperspectral imagers sample the spectral irradiance of a scene, $I(x, y, \lambda)$, where x, y, and $\lambda$ are respectively the x dimension, y dimension, and wavelength $\lambda$, to form a three dimensional (x, y and $\lambda$ dimensions) dataset known as a hyperspectral datacube. Given the two-dimensional (2D) nature of image sensors, the information contained in the spectral irradiance is either captured as a sequence of 2D datasets (i.e. scanning spectral imaging), or in a single 2D frame (i.e. snapshot) which can be decomposed into a cube during the post processing stages.

Snapshot hyperspectral imaging is a pivotal technology which can provide an immense amount of information about the temperature, composition, and rapid interactions of various material systems. Current commercially available hyperspectral imagers are either integrated into the image sensors, or require slow, scanning spectral filter banks. This limits their utility in high speed material synthesis and characterization.

Hyperspectral imagers may be applied to materials systems for analysis. Materials systems which react at extreme speeds and temperatures, such as the combustion of metals fuels like Al, B, Mg, Zr, Ti, etc., are fundamentally difficult to diagnose due to the rapid, transient nature of their reactions. These pure metal fuels have been used in energetic materials formulations for decades due to their high enthalpy of combustion on a gravimetric and volumetric basis. There is an increasing need for sophisticated diagnostics to understand and characterize next-generation metal fuels, which are being developed with variations of particle size, chemistry, and other modifications via methods such as alloying, surface coating, composite formation, etc. Metal fuels can vary widely in their burn time, temperature, emission spectra, gaseous species production, affinity for various oxidizers, and behaviors in different environments, and these properties can be widely tuned under variations of the material. To compensate for the increasing complexity of the materials systems, there is a need for increased spectroscopic information to understand the fundamental mechanisms of their burn, particularly in high-throughput methods.

Hyperspectral imagers may be applied more broadly to characterization of hot molecules and materials systems such as solid propellants, liquid fuel droplet combustion, carbon/soot combustion, as well as elements like Si, and B.

Modern spectroscopic analysis tools have evolved greatly from simple spatial and temporally integrated signals. Glumac, et al. have utilized an imaging spectrometer which can provide spectroscopic information of Al combustion at high speeds along a particular axis within a flame [Glumac, N., Absorption Spectroscopy Measurements in Optically Dense Explosive Fireballs Using a Modeless Broadband Dye Laser, Appl. Spectrosc. 2009, 63, 1075; DOI: 10.1366/000370209789379268]. They have also enhanced these methods by introducing laser-absorption to penetrate through the optically dense flames. Further, Johnson et al. have combined the technique with high-speed videography to obtain simultaneous spectroscopy and imaging by utilizing a second camera [Johnson, S.; Clemenson, M.; Glumac, N., Simultaneous Imaging and Spectroscopy of Detonation Interaction in Reactive and Energetic Materials, Appl. Spectrosc. 2017, 71, 78; DOI: 10.1177/0003702816661726]. This technique provides good spectral and temporal resolution (2.4 Å and 100 ns, respectively), but lacks spectral information from outside of the spatial region of the slit. Therefore, it is not suited for sparse reactions or for burning particulates that are in motion within the field of view of the camera, such as those that might be present in fragmentation events or material reacted on a wire. Other optical pyrometry methods use filtered photomultipliers to measure the burn temperature and time of individual particles, lack the particle-to-particle interactions that are present in larger-scale systems and cannot capture the behavior of many individual particles.

Imaging pyrometry, which utilizes existing high-speed camera systems, has also shown success, and includes variants of two- and three-color systems. In general, these techniques involve utilizing ratios of two high-speed cameras' RGB (red, green, blue) pixel values, accounting for the cameras' response at various wavelengths, and calibrating these values against a known standard such as a furnace or tungsten lamp. Though optical pyrometry can measure temperature variations in space and time, in many cases it sacrifices any spectral information present in the event due to filtering. Further, since the temperature measurements are made from integrated RGB pixel intensities, they can be skewed significantly due to the presence of emission species such as AlO, which have well-studied bands in the visible region. Therefore, these methods must be used tactfully in metal-containing systems.

What is needed is to combine the methods of spectral imaging and optical pyrometry in high-speed, spatially resolved spectroscopy which can provide (in a single video) a large statistical dataset on the burn time, temperature, and spectra of these materials, and which can be applied to a wide variety of applications. For example, the combination may assess dynamic temperature variation for individual particles, gaseous combustion species concentrations such as AlO, MgO, etc. and their timing, and the burn time of fireballs and particles. Further, scalable methods are desired that have the ability to both zoom-in to analyze micron-scale events such as the temperature and stand-off distance of individual, micron-scale Al-based particles burning in a flame and zoom-out to analyze larger scale events such as explosive fireball. Further, the methodologies may be adaptable and easy to deploy on existing high-speed cameras.

SUMMARY

According to certain embodiments, a spectral imaging system is provided. The spectral imaging system may comprise: an objective lens system; an optical splitter arranged to be in an optical path of an object being imaged through said objective lens system to provide an imaging optical path and a spectrometer optical path; a dispersion system arranged in the spectrometer optical path; and an optical combiner arranged in said imaging optical path and a path of dispersed light from said dispersion system to combined dispersed light with a corresponding optical image of the object.

According to certain embodiments, there is provided a method of spectral imaging. The method comprises: imaging an object through an objective lens system along an optical path; splitting the optical path of the object being imaged to provide an imaging optical path and a spectrometer optical path; imaging light in the imaging optical path; dispersing light in the spectrometer optical path; and combining the dispersed light from the spectrometer optical path with a corresponding optical image of the object from the imaging optical path.

BRIEF DESCRIPTION OF THE DRAWINGS

Further objectives and advantages will become apparent from a consideration of the description, drawings, and examples.

FIGS. 4A and 4B show the checkerboard images corresponding to a 488 nm laser, and white light illumination of the main and side channels, respectively. FIG. 4C illustrates overlapping patterns after image transformation. FIGS. 4D-4F shows how the transformation is applied to images of the reacting particles and the subsequent mapping. FIG. 4D is a schematic of the two channels (main and side), and how they simultaneously appear on the image sensor. FIG. 4E illustrates the raw data, while FIG. 4F shows a co-registered image.

FIG. 5A shows a combustion scene having an irradiance, FIG. 5B is a scene schematic, FIG. 5C illustrates a mask or localized image regions or spots, FIG. 5D shows a side channel image, which has spots corresponding to FIG. 5C, and FIG. 5E shows main channel spectra.

FIG. 6A is a representative image of an Al—Zr reaction with the particle of interest circled. FIG. 6B shows the SHEAR response to a Halogen lamp on blue (darker line) and green (lighter line) sensor channels. respectively. FIG. 6C shows a line image of the particle under study. FIG. 6D shows a combined spectra of the particle. FIG. 6E shows a calibrated particle spectra after factoring out the contribution from the Halogen lamp. FIG. 6G shows the ratio of the black-body intensity ratio at 450 nm to 500 nm.

FIG. 7A further illustrates the spectra from the first particle as a function of time as the first particle moves across the field of view.

FIG. 7B further illustrates the spectra from the second particle as a function of time as the second particle moves across the field of view.

DETAILED DESCRIPTION

Figure 1:
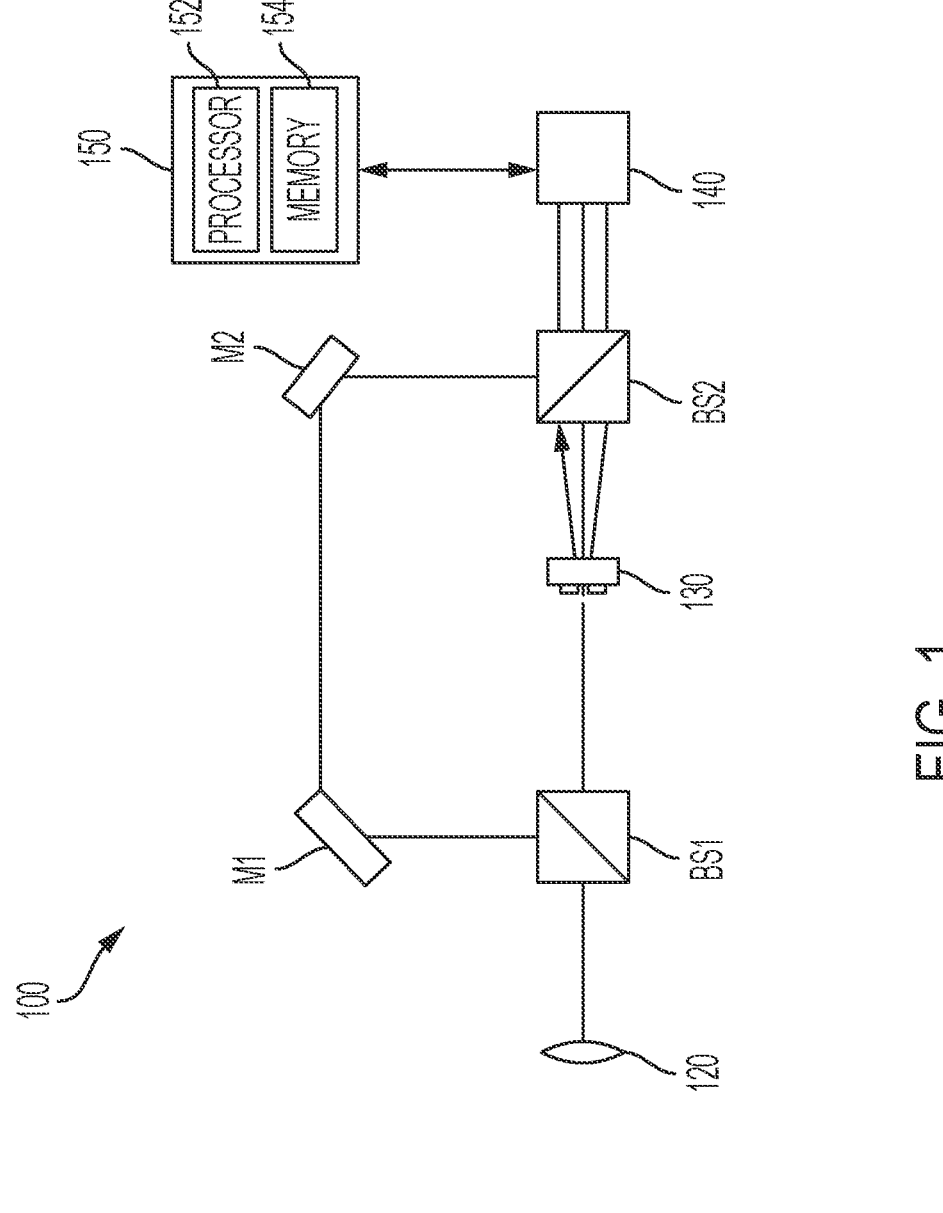
FIG. 1 is a schematic of a spectral imaging system according to some embodiments.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

According to some embodiments, a snapshot, randomly sampled imager is provided, which may be called Snapshot Hyperspectral Imager for Emission and Reactions (SHEAR). This system simultaneously captures a given scene of interest and its corresponding spatially-resolved spectra on a single 2D image sensor. The system may be low cost, wavelength agnostic, and can be paired with many commercially available camera systems. SHEAR system may include a combination of novel optical hardware and software systems which provide a low cost, versatile method for high throughput, image-based, hyperspectral analysis and characterization of material systems in applications such as combustion research, thermal spray coating, and laser additive manufacturing, for example.

SHEAR system may provide hyperspectral imaging to garner temporal and spatially resolved spectroscopy with, for example, an off-the-shelf high-speed camera system, or a lower speed camera. The term "high-speed camera" is intended to have a broad meaning to include existing or future developed high-speed cameras that can be stand-alone devices that are attached to or integrated into the current spectral imaging system, or can be specially provided detectors and electronics designed for the current system.

The SHEAR system in some embodiments is ideally suited for bright, fast, sparse, and emissive reactions such as those with metal fuels and other energetic materials. In some embodiments, the SHEAR system may be used to measure both the spectra and temperature for hundreds of individual burning Al/Zr composite metal particles in a single video (series of images). In some embodiments, for example, SHEAR may be used to analyze Al/Mg/Zr composite particles which burn rapidly in a larger deflagration plume. SHEAR is adaptable, portable, inexpensive, and easily to implement using a single camera, which may be high speed. Ultimately, due to the flexibility of the SHEAR system, the system may be employed in a variety of applications, such as in metallized and enhanced blast/thermobaric explosives, materials for bio- and chemical-agent defeat, reactive fragments, fundamental science of metal or thermite combustion, other propellant and pyrotechnic systems, and any system containing hot particles and/or gaseous species that emit radiation, for example.

A "high-speed camera" is not a requirement for this system. SHEAR can be used with any commercial image sensor in the visible, and infrared regimes. Frame rate can range from sub-Hz to MHz depending on the choice of camera, or other image sensor.

The SHEAR system combines the methods of optical pyrometry and high-speed, spatially resolved spectroscopy and provides (in a single video) a large statistical dataset on the burn time, temperature, and spectra of various material systems. Notably, the developed technology provides a means to assess dynamic temperature variation for individual particles, gaseous combustion species concentrations such as AlO, MgO, etc. and their timing, and the burn time of fireballs and particles. Further, the SHEAR system may include an image processing system configured to simultaneously measure the size, position, morphology, temperature, or emission spectra of reacting materials or molecules, solid propellants, liquid fuel droplet combustion, carbon/soot combustion, Si or B. Further, for the SHEAR system, information regarding combined dispersed light with a corresponding optical image of the object may include data from propellants, pyrotechnics, metal and non-metal fuels, carbon/soot combustion, high explosives, metallized explosives, molecules, or impact and fragmentation high speed thermography.

FIG. 1 illustrates a spectral imaging system 100 according to some embodiments. The spectral imaging system 100 may include an objective lens system 120, which is arranged to receive light from an object 10 and to image the received light ultimately to a two-dimensional image sensor 140, which may be a camera, such as a high speed camera. According to some embodiments the two-dimensional image sensor 140 is separate from spectral imaging system 100. Alternatively, the two-dimensional image sensor 140 may be a part of the spectral imaging system 100.

The spectral imaging system 100 further includes an optical splitter BS1 which is arranged to be in an optical path of the object 10 being imaged through the objective lens system 120 to provide an image optical path, and a spectrometer optical path. In FIG. 1, the imaging optical path is the path, 120, BS1, M1, M2, BS2. The spectrometer optical path is the path 120, BS1, 130, BS2. In the arrangement of FIG. 1, the optical splitter BS1 directs the light collected to provide light along the optical path to a first mirror M1, and to a second mirror M2, which directs the light along the imaging optical path to the optical combiner BS2. Further, in the arrangement of FIG. 1, the optical splitter BS1 images the light collected to provide light to the dispersion system 130, which disperses the light into a spectrum of wavelengths, which dispersed light is directed to the optical combiner BS2, to be combined with the light from the imaging optical path, and directed to the two-dimensional image sensor 140. The optical combiner BS2 may be a non-polarizing 50:50 beam splitter cube (Thorlabs BS013), for example. The optical splitter BS1 may be one of a dichroic prism or a dichroic mirror, for example. The components of the spectral imaging system 100 may be arranged such that the imaging optical path follows a side secondary path (side channel), while the spectrometer optical path follow a primary path (main channel) such as shown in FIG. 1.

The dispersion system 130 may include, for example, a transmission grating, or a reflective grating, or a prism. The grating or prism may be arranged to disperse light into a range as desired. The dispersion system 130 may include a reflecting or transmission dispersion element arranged to provide first order diffracted light to the optical combiner 140. The system may include other components beyond what is shown in FIG. 1.

The spectral imaging system 100 may further include an image processing system 150 including, for an example, a processor 152 and a memory 154. The processor 152 may perform data analysis based on data or other information from the two-dimensional sensor 140, and based on data analysis procedures stored in the memory 154, which may be a non-transitory computer readable medium. The procedures may include, for example, wavelength calibration, registration of points of the image from the imaging optical path with corresponding spectral data from the spectrometer optical path, tracking localized image regions on the image, and recovery of spectra associated with respective of the localized image regions, where these techniques are described further below.

Figure 2A:
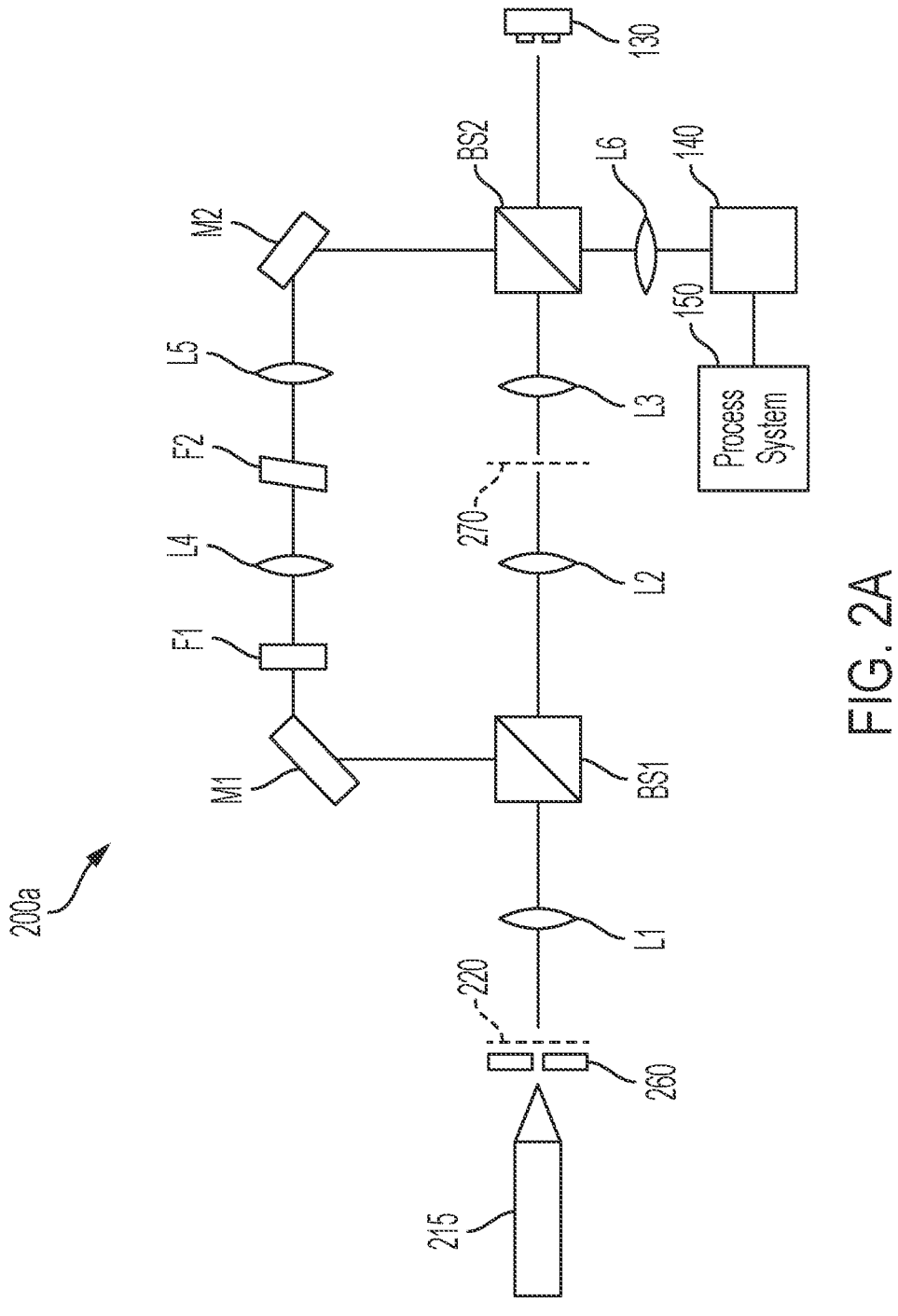
FIG. 2A is a schematic of a spectral imaging system with a reflective grating according to some embodiments.
Figure 2B:
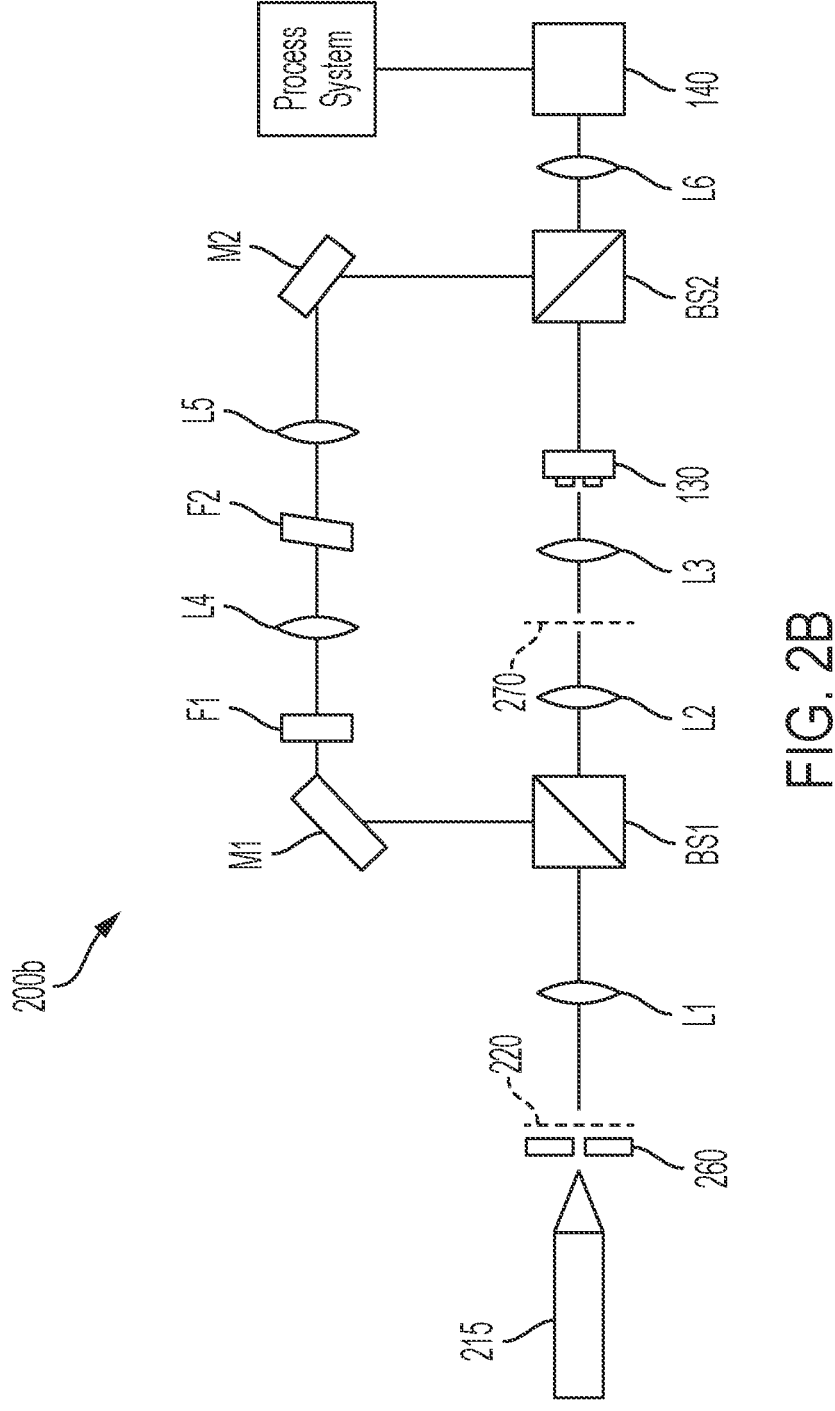
FIG. 2B is a schematic of a spectral imaging system with a transmissive grating according to some embodiments.

FIGS. 2A and 2B illustrate spectral imaging systems 200a and 200b, respectively, according to some embodiments. FIG. 2A illustrates a system where the dispersion system 130 includes a reflective grating, while FIG. 2B illustrates a system where the dispersion system 130 includes a transmission grating.

The imaging systems 200a and 200b for FIGS. 2A and 2B are comprised of two optical paths (spectrometer optical path and imaging optical path) in a similar fashion to FIG. 1. Each of the two imaging systems 200a and 200b may be disposed between a sensor lens 215, such as a macro camera lens, and the two-dimensional image sensor 140, such as a high speed camera or CCD array. The imaging optical path may in some embodiments capture a conventional high speed video, while the spectrometer optical path may capture a high resolution spectral response of the object 10, or objects, in a scene. In some embodiments, the sensor lens 215, such as a field adaptable camera lens, forms an image of the hyperspectral scene at an intermediate image plane 220 located in front of spectral imaging systems 200a or 200b. The spectral imaging systems 200a or 200b may include a tunable mechanical slit 260 (i.e. aperture) disposed on this intermediate image plane 220 in order to ensure that the spectra associated with the entire field of view falls within the sensor 140. The objective lens L1 collects light from the intermediate plane 220. The primary path (main channel or spectrometer optical path) in the system is responsible for multi-point spectral decomposition via the dispersion system 130.

For the spectrometer optical path, four bi-convex lenses (L1, L2, L3, L6) may be laid out in a 4-f configuration, for example in order to construct two 1:1 relay paths between the primary image plane, which is located at plane 220 in FIG. 2B, and the two-dimensional image sensor 140. Depending on the choice of dispersion system 130 the spectral imaging systems 200a and 200b can be used for imaging pyrometry, or high resolution, spatially resolved molecular emission and absorption characterization, for example. The optical splitter (BS1), which may be a beam splitter, may be used in the first relay stage to direct a fraction of the incoming light towards the imaging channel (i.e. side channel or imaging optical path). The desired hyperspectral scene from the main channel undergoes spectral decomposition within the second relay stage. This stage may incorporate a blazed diffraction grating in Lithrow configuration for the dispersion system 130, for example. The optical combiner BS2, for example a non-polarizing beam combiner, may be used to redirect light from both channels towards the image sensor 140. In a similar fashion to the main channel (spectrometer optical path), the side channel (imaging optical path) in the system may be made of two 4-f relay stages comprising bi-convex lenses L1, L4, L5, and L6, respectively. The spectral imaging systems 200a and 200b may include a combination of filters F1 and F2, for example, arranged as neutral density (ND) filters and color filters in order to prevent image saturation while capturing bright events.

Alternative embodiments are considered. For example, the optical combiner BS2 may include a combination of transmission gratings, and/or prisms as a diffractive element. In an alternative configuration, bi-convex lenses can be replaced with curved mirrors. Further the spectral imaging systems 200a and 200b may use any image sensor 140 regardless of the spectral range or the color choice of the image sensor 140.

The spectral imaging systems 100, 200a or 200b may be operated in different modes according to the nature of the scene to be investigated, in particular, according to the density of the scene. For example, the spectral imaging systems may be operated in a sparse and dynamic scene mode. In this mode the image includes bright, and/or emissive micro-particles which may behave as agile optical pinholes. The optical image, as well as the spectral response from each micro-particle is captured simultaneously via the image sensor 140. Overlapping spectra may be deconvolved using interative algorithms by exploiting information obtained from the side channel (image optical path) as well as temporal evolution of individual particles.

The spectral imaging systems may be operated in a dense and dynamic scene mode using a sparse set of randomly distributed apertures to sample many points in the related scene simultaneously, such as by using a mask. The distribution of the apertures can be tailored for different studies in accordance with the nature and spread of the hyperspectral scene under study. In one embodiment, the coded masks are printed on optically clear materials that can be inserted into the field of view according to the experimental scene. As shown in FIGS. 2A and 2B, a mask 270 may be incorporated into the spectral imaging systems 200a and 200b. The mask 270 may be coded or otherwise.

Figure 3A:
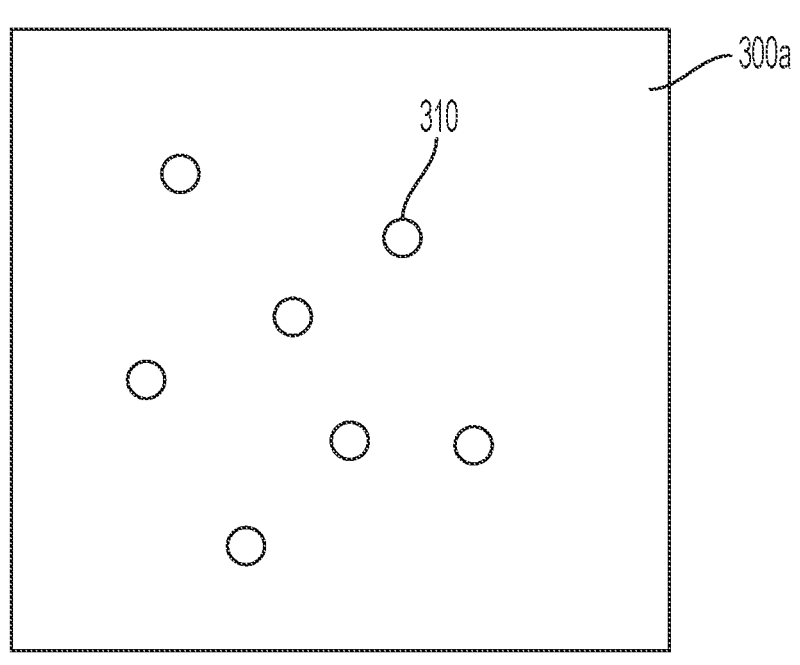
FIGS. 3A and 3B illustrate examples of coded masks according to some embodiments.
Figure 3B:
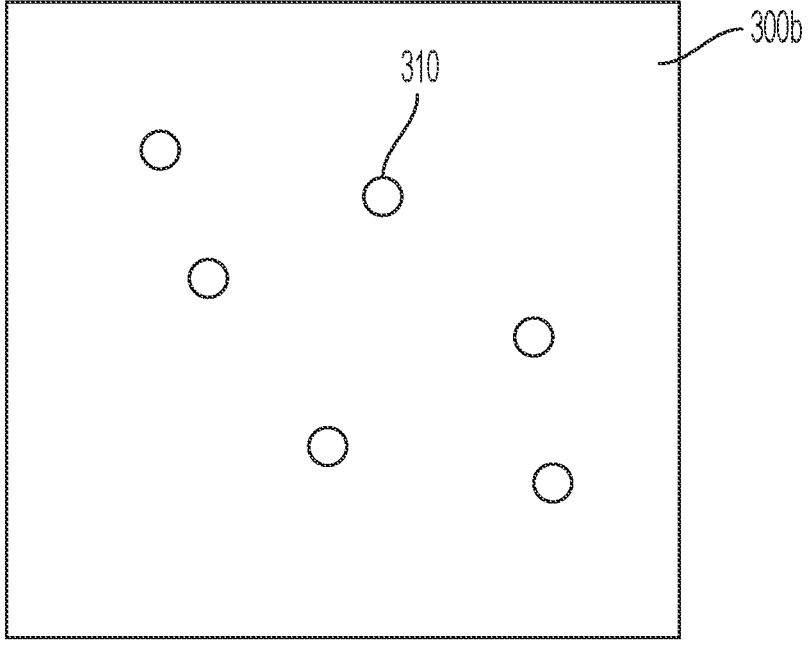

FIGS. 3A and 3B illustrate examples of coded masks 300a and 300b, respectively. Each of the masks include a number of apertures 310 arranged on the mask. The coded masks may be printed on optically clear materials.

Image Registration

The image processing system 150 may be configured to register spectral information with at least one of localized image regions or spots from information received from the two dimensional sensor 140. One feature of the spectral system according to certain embodiments is the ability to obtain wide-field (i.e. image optical path) and spectral images of the scene, via the spectrometer optical path, under study side by side. Given the complex nature of emission events it is beneficial to spatially register the side channel (image optical path) images to the spectral data (spectrometer optical path). Image registration may be carried out in two steps according to some embodiments:

In step 1 an object containing uniformly spaced checkerboard patterns is placed in the system object plane. In step 2 images from both channels are captured. An affine transform function, such as from MATLAB, may be used in order to map the side channel data to the spectral channel. An image registration transformation matrix may be obtained matching checkerboard corners in the two channels.

Figures 4A, 4B, 4C, 4D, 4E, 4F:
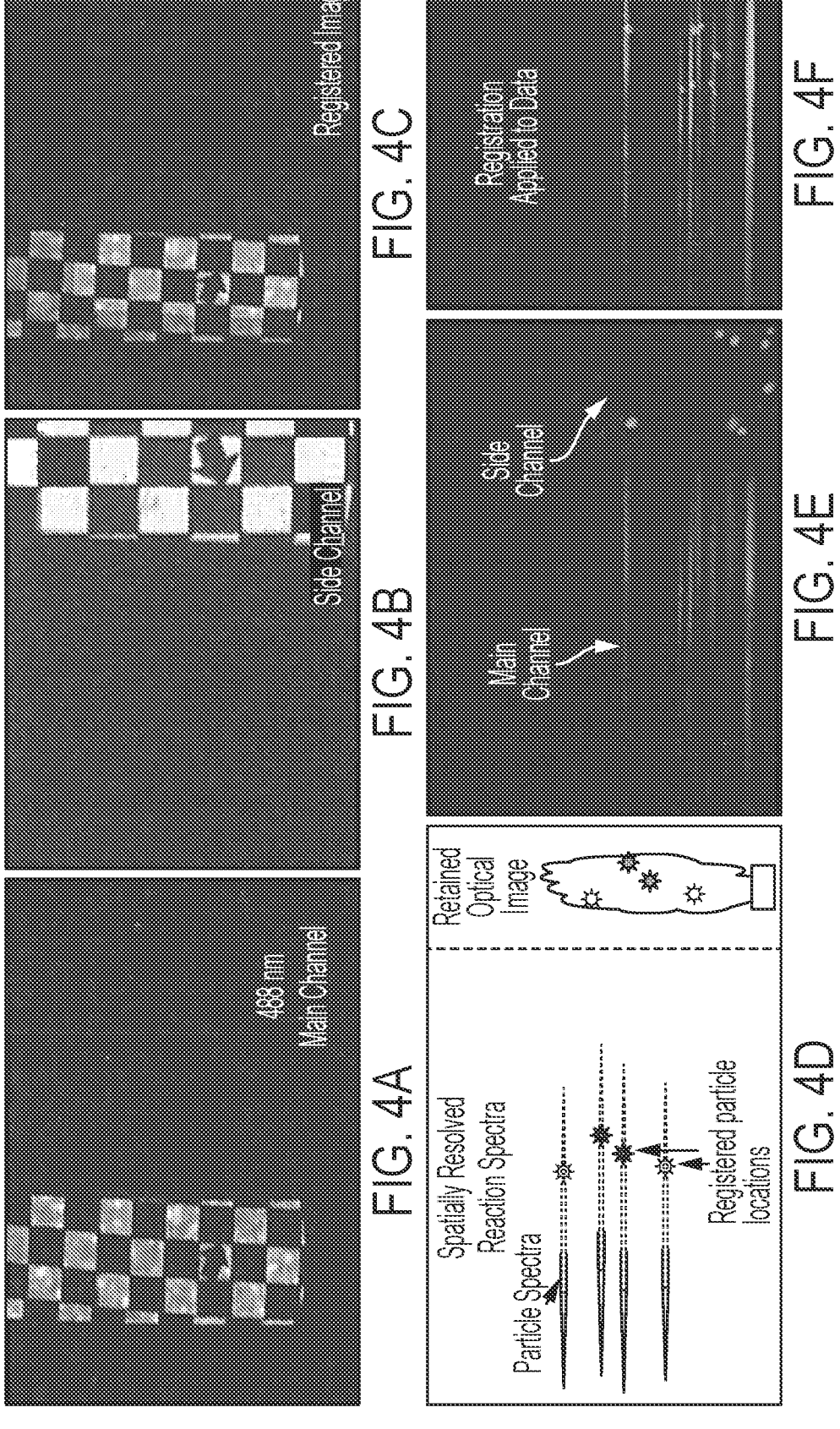
FIGS. 4A-4F illustrate the registration process according to some embodiments.

FIGS. 4A-4F illustrate the registration process. FIGS. 4A and 4B show the checkerboard images corresponding to a 488 nm laser, for example, and white light illumination of the main and side channels, respectively. In order to ensure uniform, speckle free imaging of the main channel a rotating engineered diffuser, such as Thorlabs ED1-C50, may be used in front of the laser source. The transformation matrix was obtained in post processing stage where 6-12 matching corners were identified between the main and side channel images. A fitting function, such as MATLAB's fitgeotrans function, may be used to map the side channel to the main channel. FIG. 4C illustrates overlapping patterns after image transformation. While mapping is carried out at 488 nm wavelength in some embodiments, the mapping can be carried over to any other wavelength by a linear shift proportional to the image sensor 140 (camera) pixel to wavelength mapping. FIGS. 4D-4F shows how the transformation is applied to images of reacting PVD particles and the subsequent mapping.

Particle Tracking

Particles in the image may be tracked through multiple frames over time according to some embodiments. In the case of a particle moving around or through the image frame, the particle position may be tracked over time. In some embodiments, the tracking may use the spatial sparsity over multiple frames and reconstruct the full lifecycle of individual particles.

According to some embodiments of tracking, the particles are identified on every frame by applying a gaussian filter and thresholding, followed by a basic peak search that locates the centroid of every particle. In addition to the centroid, the particle size data may be collected as a circular area and circumference.

In order to track the particles over multiple frames, identified particles may be linked together based on their relative position across successive frames. This is achieved by applying an iterative algorithm that uses only the particle centroid positions and a maximum search radius. The search radius is determined by the maximum particle speed that can be tracked based on the pixel to particle size ratio.

According to some embodiments, the particle tracking algorithm may execute the following steps:
1. Particles are initialized as starting positions for tracking in the first frame n=1.
2. Particle positions in frame n+1 are compared to particle positions in frame n.
   (a) The minimum difference between positions in frame n and n+1 is found.
      (i) If the difference is less than the maximum search radius, particle from frame n+1 is assigned to a corresponding particle in frame n and the position pair is removed from the particle position index. (a) is then repeated.
      (ii) If the difference is greater than the maximum search radius, break.
   (b) All remaining particles on frame n are removed, and all remaining particles on frame n+1 are initialized as starting positions, break.
3. Repeat step 2 with the next frame, n=n+1.

Spectra Recovery

Spectra from localized image regions or spots, such as particles, may overlap with each other. In order for the

9

Figures 5A, 5B, 5C, 5D, 5E:
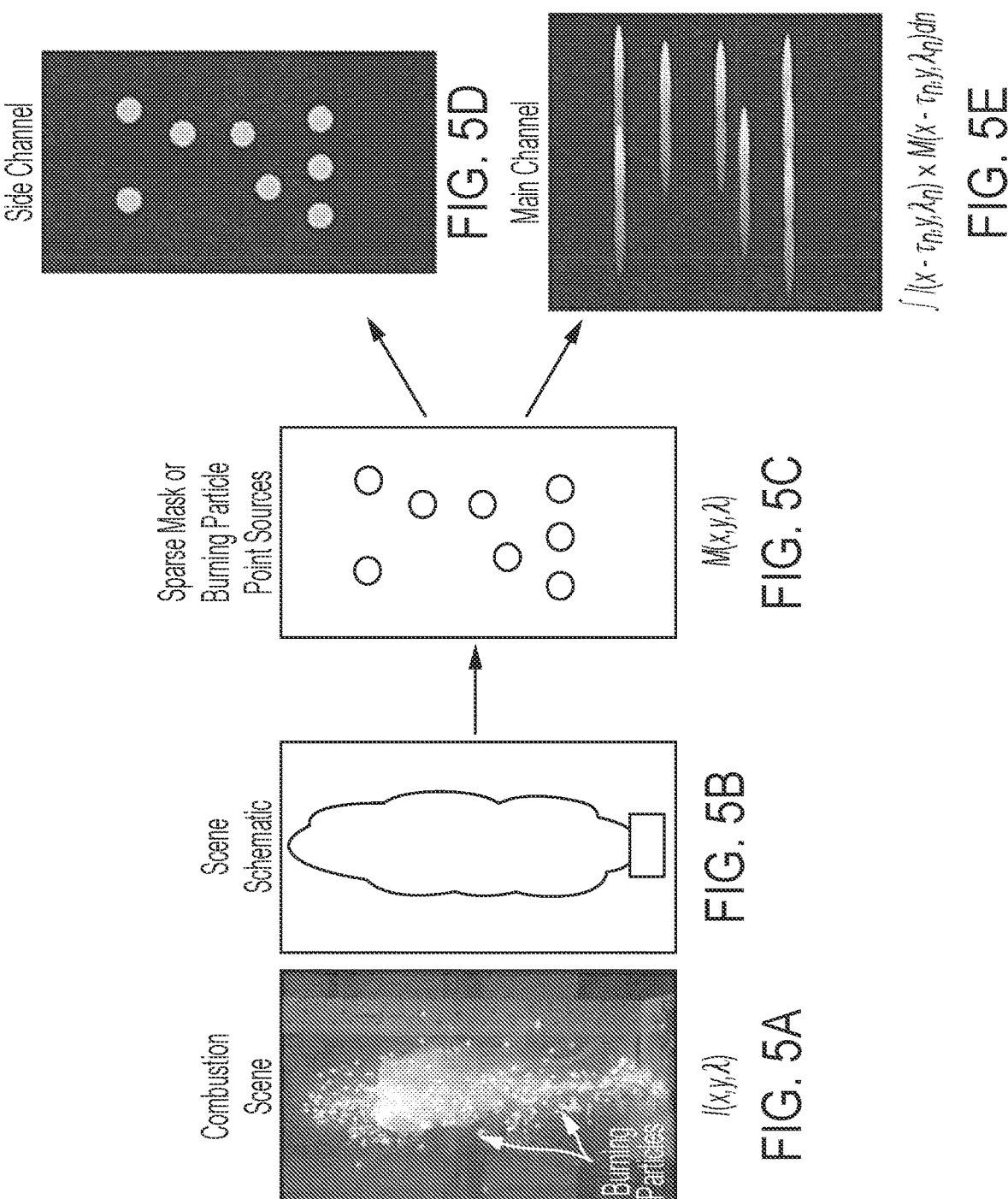
FIGS. 5A-5E illustrate a flow diagram of a spectra recovery process according to some embodiments, where

10 spectra for a particular particle to be recovered, the spectra may be deconvolved and spectral de-multiplexing may thus be performed. FIGS. 5A-5E illustrate a data flow diagram, where FIG. 5A shows a combustion scene having an irradiance, FIG. 5B is a scene schematic, FIG. 5C illustrates a mask or localized image regions or spots, FIG. 5D shows a side channel image, which has spots corresponding to FIG. 5C, and FIG. 5E shows main channel spectra. The scene with irradiance $I(x, y, \lambda)$ is relayed over to either a sparse mask, $M(x, y, \lambda)$ which samples multiple points across the field of view, or a fully transmissive mask with spots from the sampled scene, where x is along the dispersion direction, y is perpendicular to x, and $\lambda$ is the light wavelength. Given that the dispersion is along the x direction of the image sensor 140, the sampled scene should be sparse along this axis according to certain embodiments. The sparsely sampled points are then mapped onto the image sensor 140 via the dispersive system 130 (e.g. diffraction grating), in the main channel, and via a 4-f relay in the side channel. Signals obtained from the main and side channels are therefore given by, integral $(I(x \times \tau_n, y, \lambda_n) \times M(x \times \tau_n, y, \lambda_n) dn)$, and $I(x, y, \lambda) \times M(x, y)$ respectively, where $\tau_n$ represents the pixel shift at wavelength $\lambda_n$ due to the dispersion. The task is then to recover $I(x, y, \lambda_n)$ from the above two measurements based on the main and side channels. $\tau_n$ and $\lambda_n$ can be extracted from the experimental parameters.

The sparsity assumption implies that only N<<P pixels are active (i.e. have mask with unity transmission) in any given vertical line, where N may be the number of pixels in the side channel associated with the transmissive features (apertures 310) in the mask 300, or the number of bright burning particles, and P may be the total number of image pixels. The problem can then be formulated using matrix notations as follows:

$$
\begin{bmatrix} y_1 \\ y_2 \\ \cdot \\ \cdot \\ \cdot \\ y_M \end{bmatrix}_{M \times P} = \begin{bmatrix} 1 & 0 & \dots & & 0 \\ 0 & 1 & \dots & & 0 \\ & & \cdot & & \\ & & \cdot & & \\ & & \cdot & & \\ 0 & 0 & \dots & 1 & 1 & 1 \end{bmatrix}_{M \times P} \times \begin{bmatrix} x_1 \\ x_2 \\ \cdot \\ \cdot \\ \cdot \\ x_N \end{bmatrix}_{N \times P} \tag{1}
$$

Y and X are the measurement and the spectral information respectively. The binary matrix, denoted as A, represents the active mask elements. Each row in the X matrix is padded with zeros in accordance to the known spectral extent of the signals, and the spectral centroid which is obtained from the side channel. Our recovery algorithm attempts to solve for X such that Y−AX is minimized.

Specifically, the side channel can then be used to track particle position over time to generate the particle position map $P(x, y, t)$ where every particle exists at some point in space and time $p_n(x, y, t)$ where n is the particle number. The main channel image can be described as a linear combination of all the particles spectra. This can be described simply as $$Y=PS \tag{2}$$

where Y is the main channel image and S are the particles' spectra. From this formulation we note the similarity to the standard compressed sensing equation of Y=AX, where Y are the compressed measurements, A is known as sensing matrix, and X is the signal of interest. Compressed sensing theory states that a sparse signal X can be reconstructed with a small number of measurements Y, that are the inner product between the signal and the A matrix. This technique can then be used to both de-multiplex overlapping particle spectra and remove background noise, taking full advantage of compressed sensing techniques.

To recover the spectra of a particle at index k, we select compressed measurements to be the rows of the main channel image around which k illuminates the sensor, $y_k=Y$ $(\lambda, p_k(x, y, t)>0)$. Each measurement contains information that can be used to reconstruct the true spectra of particle k over time. The A matrix is constructed using the position of other particles that exist in the rows occupied by the particle k. As well as in a single frame, as the particles moves throughout the field of view there are numerous combinations of particle spectra that illuminate the sensor, generating a pseudorandom A matrix that maps particle spectra to the sensor pixels. This can be described as $$y_k=A_k S \tag{3}$$

where $A_k$ is a sparse matrix that represents all particles that exist over the spatial and temporal duration of particle k, over which is collected the measurements $y_k$. The algorithm will come up with the sparsest solution for the particle spectrum $\hat{S}_k(\lambda, t)$ while maintaining fidelity with the measurements by minimizing $y_k-A_k$ S⁻. In addition to the denoising effects of the sparse solution, a phantom particle may be added to intelligently remove sensor background noise.

The following steps describe how the data is processed including spectral de-multiplexing according to some embodiments:

1. The side channel is used for particle identification that includes image thresholding and Gaussian filtering.

2. The particle map P is constructed by tracking particles over the image frames.

3. The compressed measurements and A matrix for every particle is constructed using the particle map P and main channel images Y.

4. Compressed sensing algorithm reconstructs the spectral evolution over time for each particle spectra S.

5. Wavelength calibration gives the blackbody irradiance I and temperature is determined using curve fitting with a graybody emitter.

Wavelength Calibration and Temperature Measurements

Figure 6A:
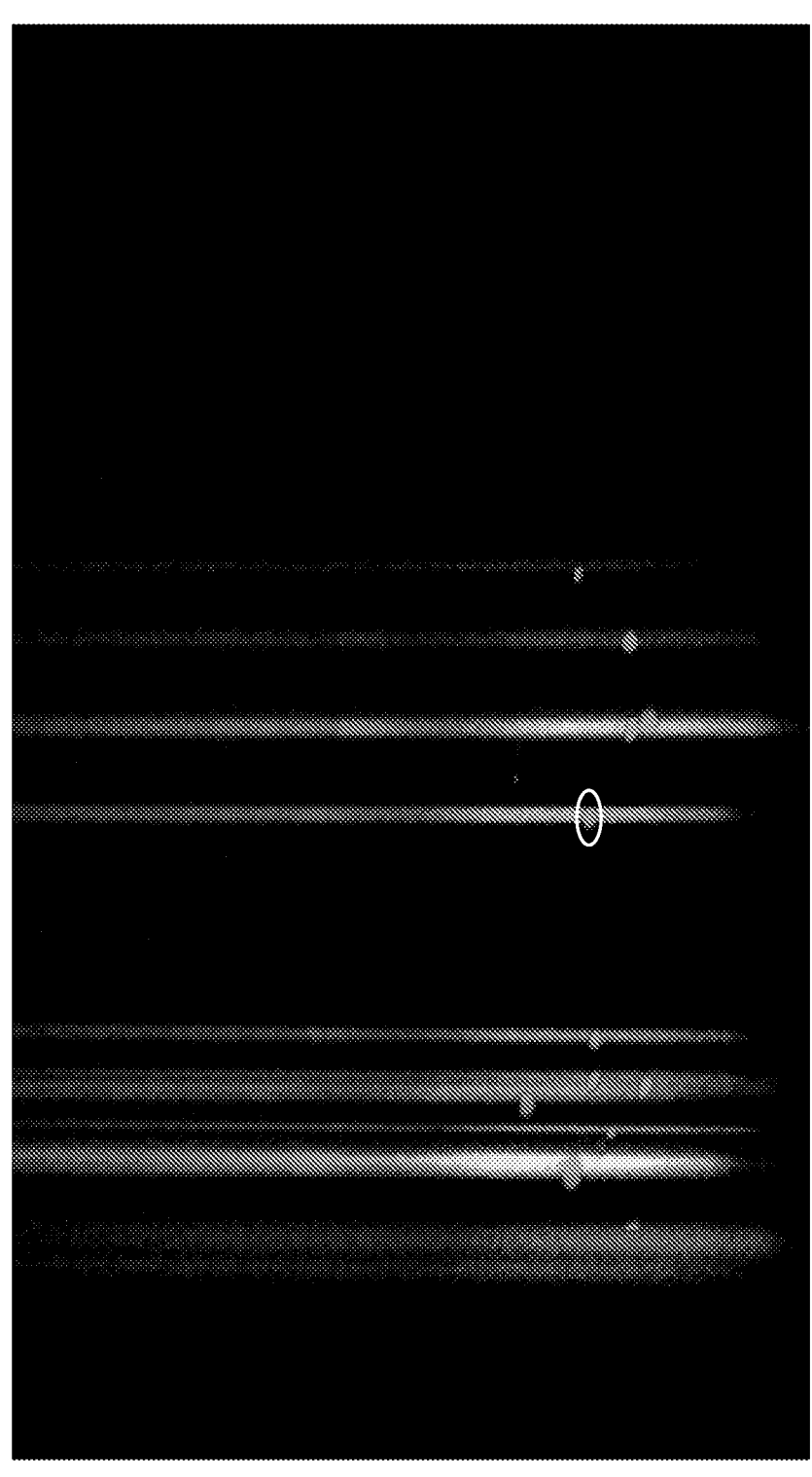
FIGS. 6A-6G demonstrate the process used to estimate a burning particle temperature according to some embodiments.
Figures 6B, 6C, 6D, 6E, 6F, 6G:
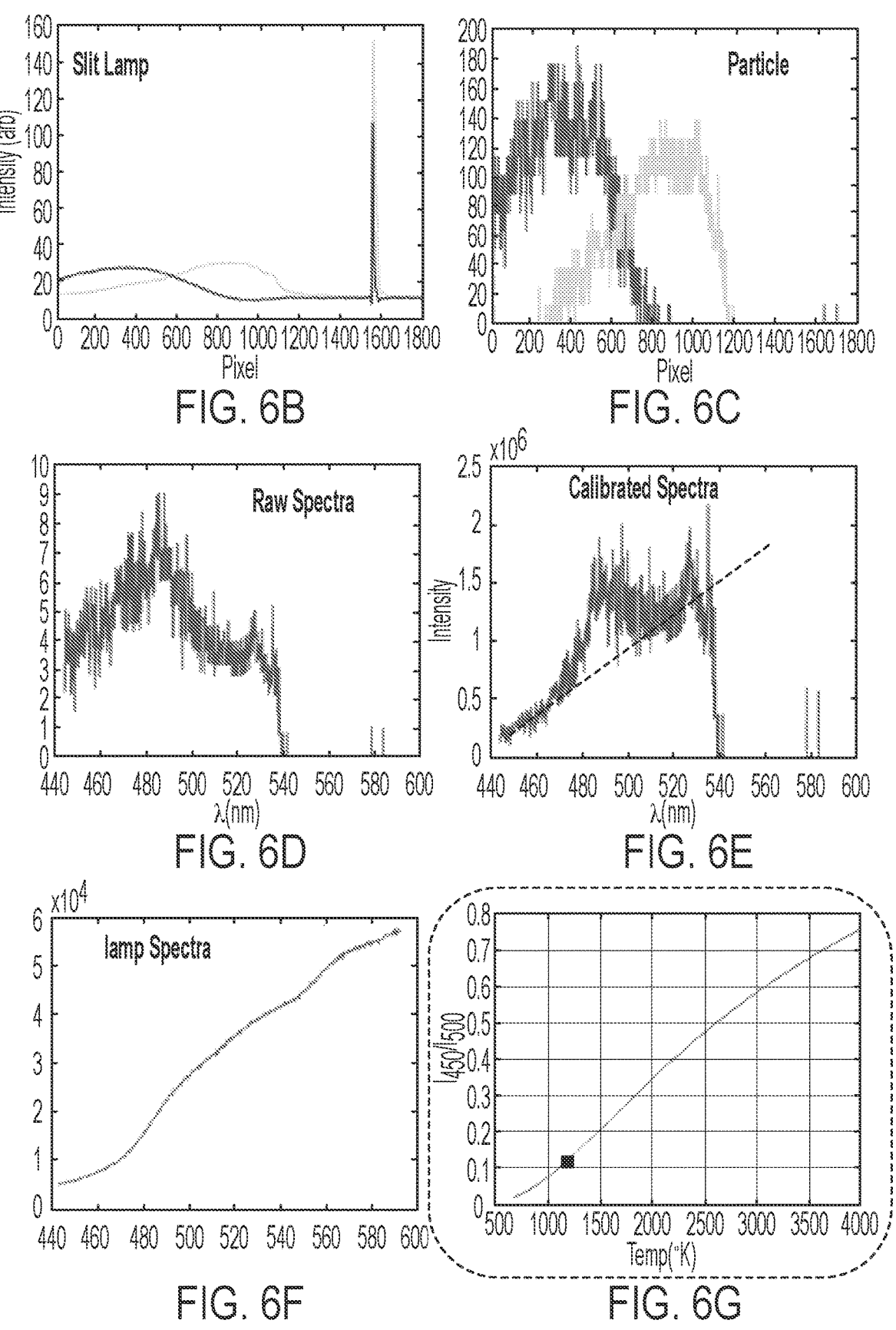

Temperature estimation in imaging may be performed by mapping the measured spectra to Plank's black-body radiation curve. In order to carry out the temperature calibration, however, one must account for the spectral response from various optical components, as well as any color filters on the sensor 140. FIGS. 6A-6G demonstrates the process used to estimate the burning particle temperature. Upon wavelength calibration, light from a Halogen source is passed through a narrow slit and the spectral response of the SHEAR is recorded on the sensor 140. FIG. 6A is a representative image of an Al—Zr reaction with the particle of interest circled. FIG. 6B shows the SHEAR response to the Halogen lamp on the blue (darker line) and green (lighter line) sensor channels, respectively. FIG. 6C shows a line image of the particle under study. FIG. 6D shows a combined spectra of the particle. FIG. 6E shows a calibrated particle spectra after factoring out the contribution from the Halogen lamp (see FIG. 6F). The line is the linear fit through the particle spectra while neglecting the contribution from the emission peaks. FIG. 6G shows the ratio of the black-body intensity ratio at 450 nm to 500 nm. The square indicates the temperature that best matches the fitted linear curve over the burning particle. In order to obtain source independent system response, the lamp images for each channel were divided by the lamp spectra from a commercial spectrometer FIG. 6F.

Example Applications

Figures 7A, 7B:
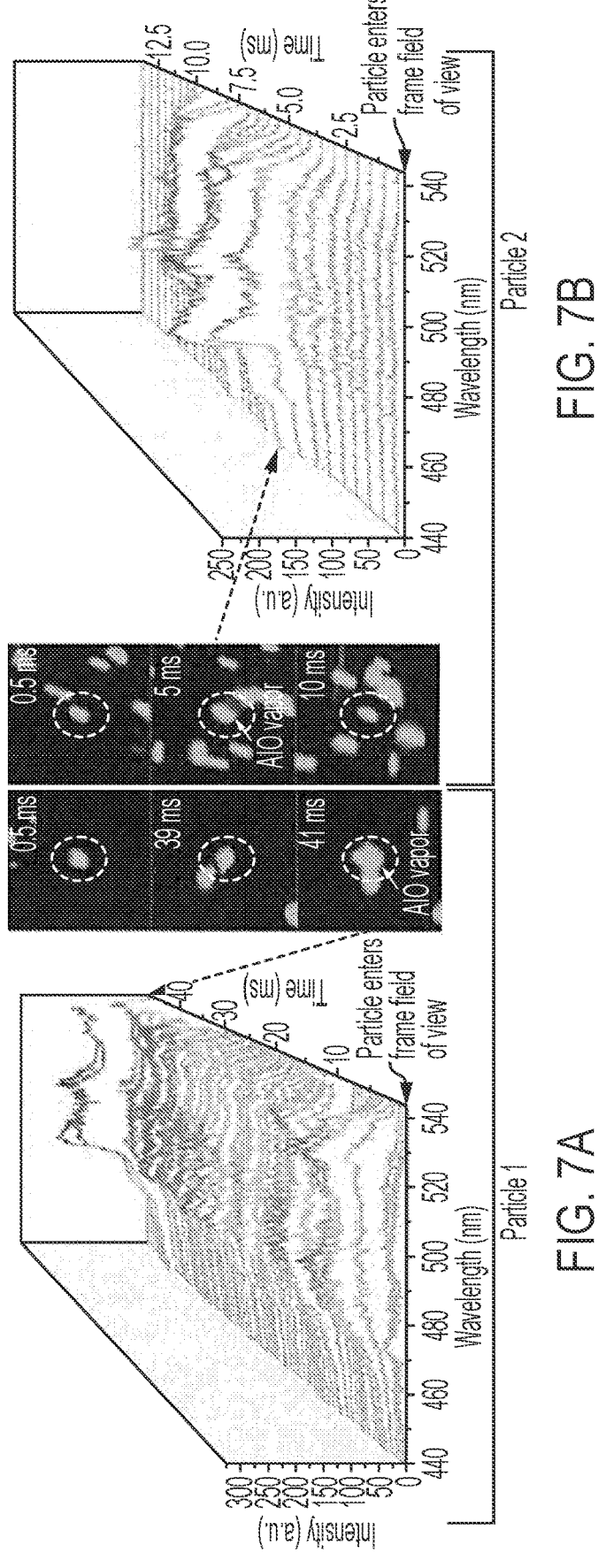
FIG. 7A illustrates an image of a first particle moving across a field of view over time, where the particle is circled in white, according to some embodiments.
FIG. 7B illustrates an image of a second particle moving across a field of view over time, where the particle is circled in white, according to some embodiments.

Example applications for the SHEAR system include high resolution dynamic imaging spectroscopy and full color pyrometry. For example, in the high-resolution mode, the increased dispersion due to a grating spacing of 1200 line/mm for a diffraction grating provides higher spectral resolution while simultaneously decreasing the wavelength range sampled due to the fixed area of the sensor. The Al in the materials used reacts with oxygen to produce the AlO peaks in the blue-green region of the spectrum. FIGS. 7A-7B show these peaks exhibited by two burning particles. The molecular AlO bands are well studied and represent vapor-phase combustion of the Al species within the particles. Greybody fitting over such a short wavelength region is possible but can cause larger uncertainties in the temperature measurement relative to the full-color mode. FIG. 7A illustrates an image of a first particle moving across a field of view over time, where the particle is circled in white. FIG. 7A further illustrates the spectra from the first particle as a function of time as the first particle moves across the field of view. FIG. 7B illustrates an image of a second particle moving across a field of view over time, where the particle is circled in white. FIG. 7B further illustrates the spectra from the second particle as a function of time as the second particle moves across the field of view.

Figure 8:
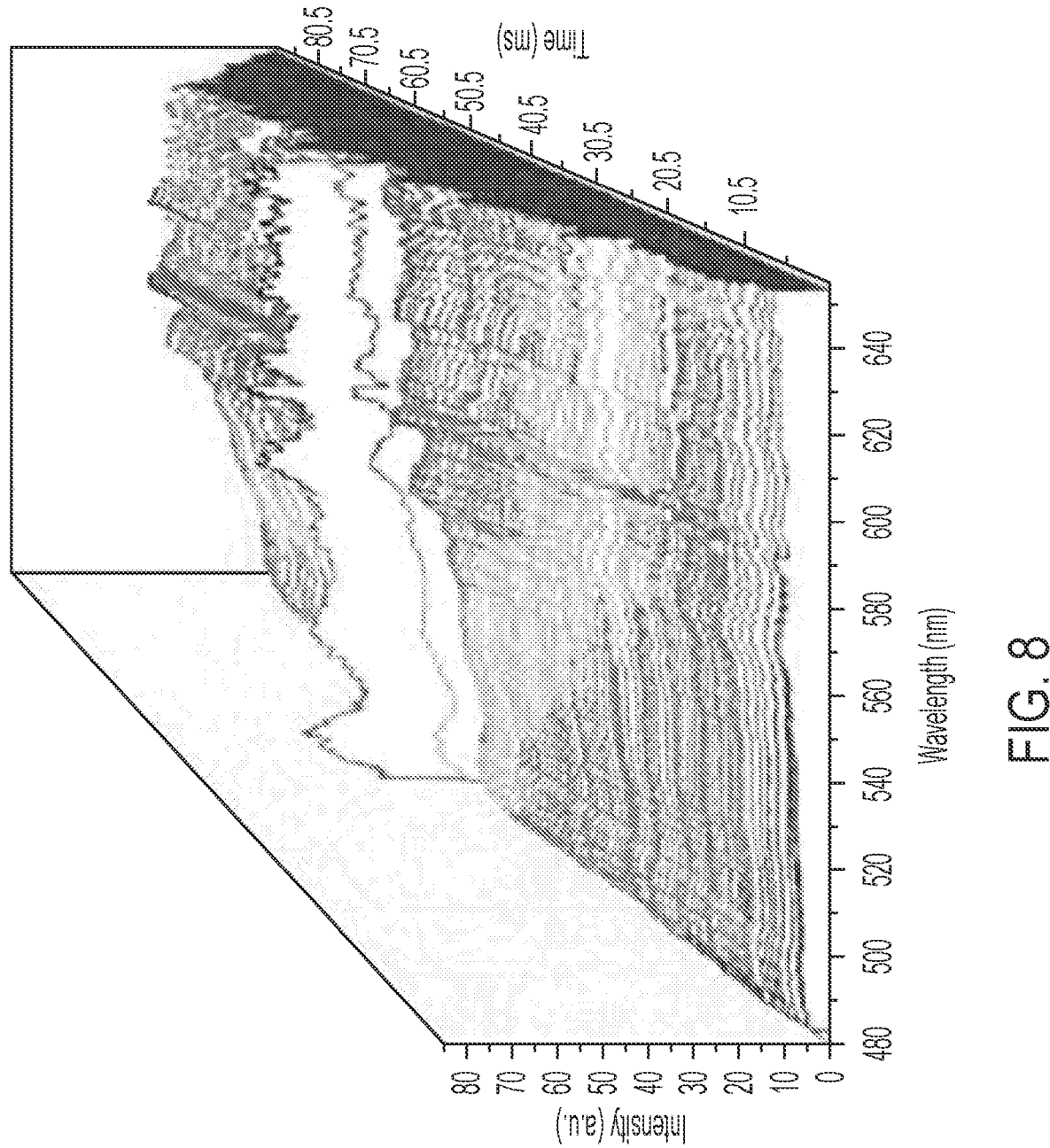
FIG. 8 illustrates the temperature evolution for a representative particle which stays within the imaging field of view for 180 frames, according to some embodiments.

In the full-color pyrometry mode, the wavelength range may be expanded (at the expense of resolution) to include light in the red visible region, allowing for lower temperatures to be measured and a larger dynamic range for graybody fitting. FIG. 8 shows the temperature evolution for a representative particle which stays within the imaging field of view for 180 frames. The videos were captured using a 300 lines/mm diffraction grating and temperature was estimated by fitting the particle's radiation patterns to a theoretical graybody. The curve fitting was accomplished using MATLAB'sfittype function. The function is a nonlinear least square minimization method based on the Levenberg-Marquardt algorithm. Since the particle's emissivity is unknown, the fitting algorithm estimates the emissivity and temperature which best represented the measured curve. As is seen in FIG. 8, the particle experiences a drop in temperature (prior to a microexplosion). These microexplosion events are well studied in related works, and this system allows for correlation of morphological changes such as microexplosions with the temperature of the particle/flame at the same moment. The microexplosion is followed by a sudden energy release which manifests itself as a 400 K rise in the temperature.

Figure 9A:
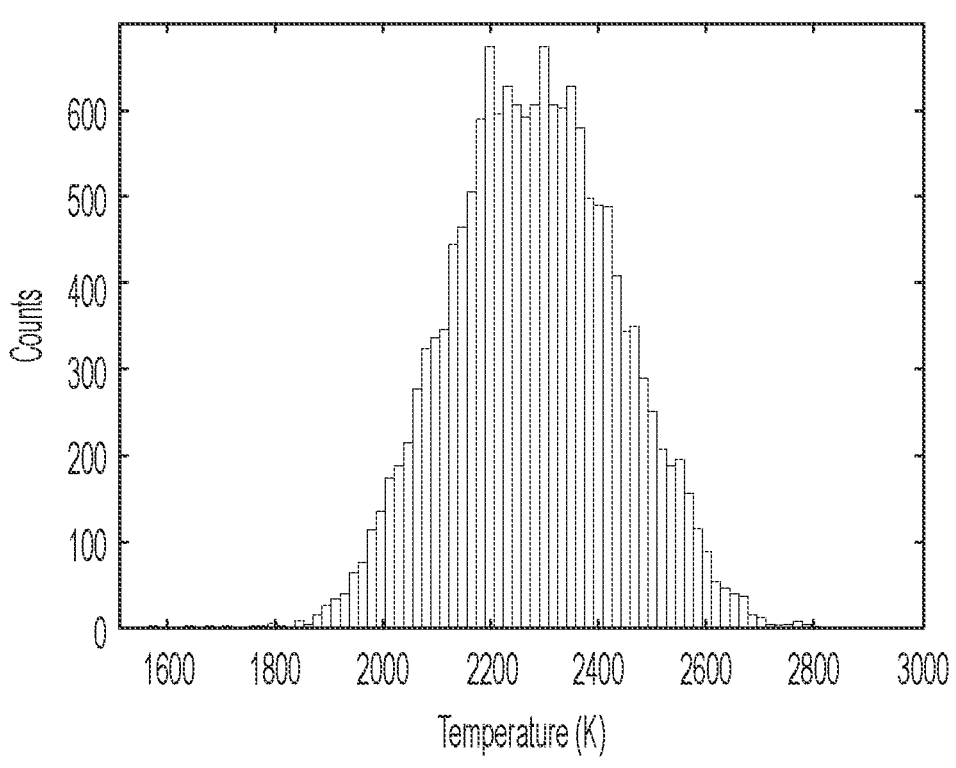
FIG. 9A illustrates the temperature statistics for all the particles during their entire lifetime, according to some embodiments.
Figure 9B:
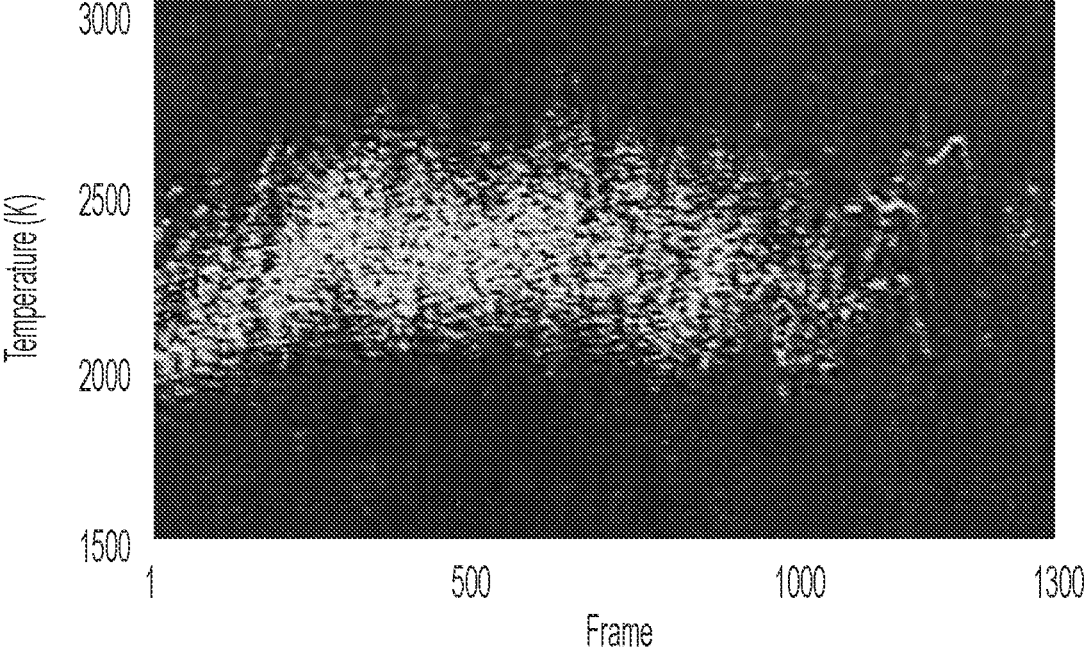
FIG. 9B illustrates how all the particles in a given frame are distributed across the temperature range, according to some embodiments.

FIG. 9A shows the temperature statistics for all the particles during their entire lifetime. On average most particles reach temperatures around 2300 K. Higher temperatures in this system are usually achieved during vapor-phase combustion (e.g., corresponding to AlO formation). It is worth noting that while almost every particle experiences micro-explosions, not every micro-explosion falls in the imaging field of view. FIG. 9B shows how all the particles in a given frame are distributed across the temperature range.

The temperature information in FIGS. 9A and 9B can be mapped onto the side channel (optical video) images of the particles as they are in motion through the video frame.

Figure 10:
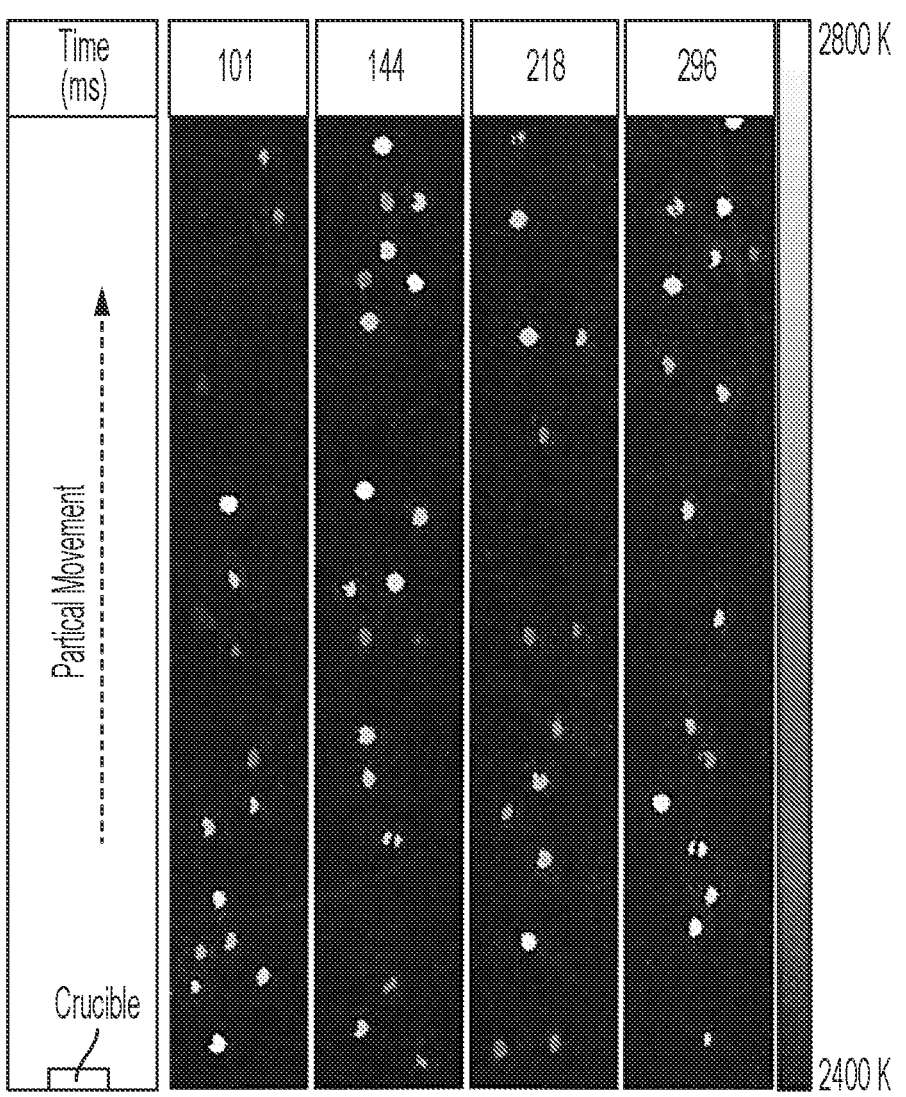
FIG. 10 illustrates several representative frames (101, 144, 218, 296) of a high speed video of particles with temperature mapping, according to some embodiments.

Several representative frames of a high-speed video with this temperature mapping completed are shown in FIG. 10.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A spectral imaging system, comprising:
an objective lens system;
an optical splitter arranged to be in an optical path of an object being imaged through the objective lens system to provide an imaging optical path and a spectrometer optical path;
a dispersion system arranged in the spectrometer optical path;
an optical combiner arranged in the imaging optical path and a path of dispersed light from the dispersion system to provide combined dispersed light with a corresponding optical image of the object; and
a two-dimensional image sensor arranged in a path of the combined dispersed light with the corresponding optical image of the object,
wherein the combined dispersed light with the corresponding optical image of the object are spatially overlapping on the two-dimensional image sensor, and
wherein the two-dimensional image sensor captures the combined dispersed light with the corresponding optical image in a single frame.

2. The spectral imaging system according to claim 1, wherein the dispersion system comprises a reflecting dispersion element arranged to provide first order diffracted light to the optical combiner.

3. The spectral imaging system according to claim 1, wherein the optical splitter is one of a dichroic prism or a dichroic mirror.

4. The spectral imaging system according to claim 1, further comprising an image processing system configured to communicate with the two-dimensional image sensor to receive information regarding the combined dispersed light with the corresponding optical image of the object.

5. The spectral imaging system according to claim 4, wherein the image processing system is configured to simultaneously measure the size, position, morphology, temperature, or emission spectra of reacting materials or molecules, solid propellants, liquid fuel droplet combustion, carbon/soot combustion, Si or B.

6. The spectral imaging system according to claim 4, wherein the image processing system is further configured to register spectral information with at least one of localized image regions or spots from the information received from the two-dimensional image sensor.

7. The spectral imaging system according to claim 6, wherein the image processing system is further configured to track over time a position of each of the at least one of localized image regions or spots from the information received from the two-dimensional image sensor.

8. The spectral imaging system according to claim 7, wherein the image processing system is further configured to track the position of each of the at least one of localized image regions or spots over a series of frames.

9. The spectral imaging system according to claim 7, wherein the image processing system is further configured to recover spectral information registered with each of the at least one of localized image regions or spots from the information received from the two-dimensional image sensor.

10. The spectral imaging system according to claim 9, wherein the image processing system is arranged to process the spectral information data in the form of 3-dimensional hyperspectral cubes, and to recover the spectral information registered with each of the at least one of localized image regions or spots by deconvolution using spectral de-mixing.

11. The spectral imaging system according to claim 4, wherein the image processing system is further configured to provide a temperature map corresponding to the spectral information.

12. The spectral imaging system according to claim 4, wherein the information regarding the combined dispersed light with the corresponding optical image of the object includes data from propellants, pyrotechnics, metal and non-metal fuels, carbon/soot combustion, high explosives, metallized explosives, molecules, or impact and fragmentation high speed thermography.

13. The spectral imaging system according to claim 1, further comprising a transmissive mask arranged to randomly sample a field of view in the path of dispersed light.

14. The spectral imaging system according to claim 1, wherein the two-dimensional image sensor is configured to form a hyperspectral datacube comprising spatial and spectral dimensions from the single frame.

15. The spectral imaging system according to claim 14, wherein the image processing system is configured to deconvolve overlapping spectra from a plurality of localized image regions by exploiting temporal evolution of the localized image regions across a series of frames to recover spectral information for each of the localized image regions.

16. A method of spectral imaging comprising:
imaging an object through an objective lens system along an optical path;
splitting the optical path of the object being imaged to provide an imaging optical path and a spectrometer optical path;
dispersing light in the spectrometer optical path; and
combining the dispersed light from the spectrometer optical path with a corresponding optical image of the object from the imaging optical path; and
imaging the combined dispersed light with the corresponding optical image of the object with a two-dimensional image sensor,
wherein the combined dispersed light with the corresponding optical image of the object are spatially overlapping on the two-dimensional image sensor, and
wherein the two-dimensional image sensor captures the combined dispersed light with the corresponding optical image in a single frame.

17. The method according to claim 16, further comprising receiving information regarding the combined dispersed light with the corresponding optical image of the object.

18. The method according to claim 17, further comprising registering spectral information with at least one of localized image regions or spots from the information received.

19. The method according to claim 18, further comprising tracking over time a position of each of the at least one of localized image regions or spots from the information received.

20. The method according to claim 19, further comprising recovering spectral information registered with each of the at least one of localized image regions or spots from the information received.

* * * * *